United States Patent
Kuroda et al.

(10) Patent No.: US 7,023,376 B1
(45) Date of Patent: Apr. 4, 2006

(54) RADAR APPARATUS

(75) Inventors: Hiroshi Kuroda, Hitachi (JP); Kazuaki Takano, Mito (JP); Mitsuru Nakamura, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 194 days.

(21) Appl. No.: 10/257,256

(22) PCT Filed: Aug. 30, 2000

(86) PCT No.: PCT/JP00/05859

§ 371 (c)(1),
(2), (4) Date: Feb. 28, 2003

(87) PCT Pub. No.: WO02/18972

PCT Pub. Date: Mar. 7, 2002

(51) Int. Cl.
*G01S 13/93* (2006.01)

(52) U.S. Cl. .................... 342/70; 342/195; 342/196
(58) Field of Classification Search ............ 342/70, 342/71, 72, 195, 196, 104, 99, 102, 109, 342/111, 115, 127, 130, 134, 135, 200–202
See application file for complete search history.

(56) References Cited

U.S. PATENT DOCUMENTS

| 5,302,956 | A | | 4/1994 | Asbury et al. | |
|---|---|---|---|---|---|
| 5,424,749 | A | * | 6/1995 | Richmond | 342/192 |
| 5,508,706 | A | | 4/1996 | Tsou et al. | |
| 6,104,336 | A | * | 8/2000 | Curran et al. | 342/70 |
| 6,140,954 | A | * | 10/2000 | Sugawara et al. | 342/70 |
| 6,266,004 | B1 | * | 7/2001 | Pannert et al. | 342/70 |
| 6,275,180 | B1 | * | 8/2001 | Dean et al. | 342/70 |
| 6,335,701 | B1 | * | 1/2002 | Fujisaka et al. | 342/115 |

FOREIGN PATENT DOCUMENTS

| DE | 19727288 | 1/1999 |
|---|---|---|
| JP | 9-133765 | 5/1997 |
| JP | 10-20025 | 1/1998 |
| JP | 2000-46932 | 2/2000 |

* cited by examiner

*Primary Examiner*—Thomas H. Tarcza
*Assistant Examiner*—Isam Alsomiri
(74) *Attorney, Agent, or Firm*—Crowell & Moring LLP

(57) ABSTRACT

The invention provides a radar that transmits a radio wave and receives an echo of the radio wave, which is characterized by possessing (1) a reception means that detects a beat signal of the echo and the radio wave, (2) a first frequency analysis means that analyzes the beat signal into frequency components, and detects a peak signal of frequency spectra obtained thereby, and (3) a second frequency analysis means that analyzes the beat signal into frequency components with a frequency resolution different from that of the first frequency analysis means, and detects a peak signal of frequency spectra obtained thereby.

21 Claims, 17 Drawing Sheets

FIG.16
(A)
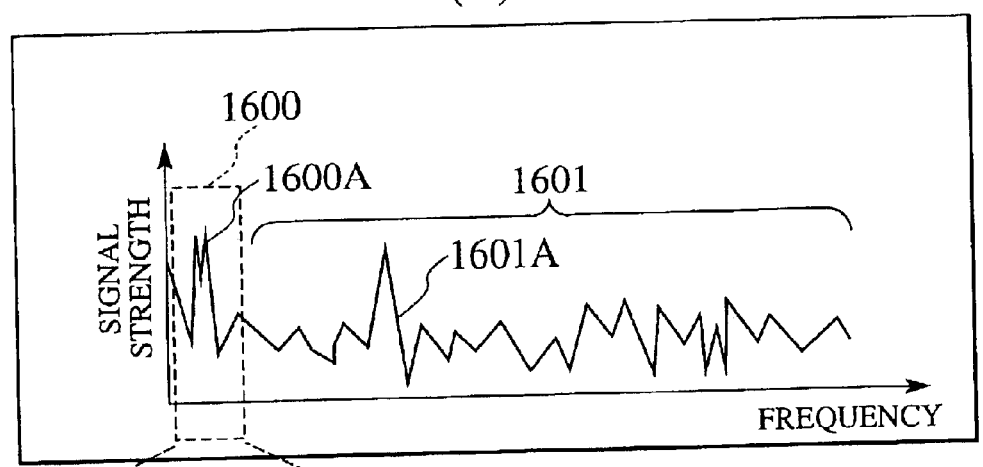
(B)
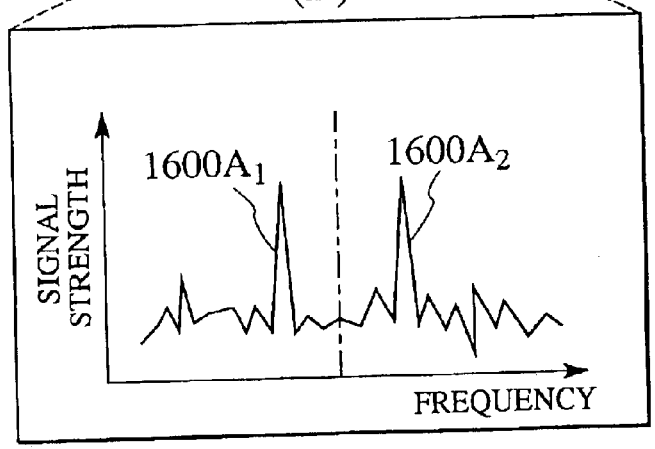

RADAR APPARATUS

DESCRIPTION

1. Technical Field

The present invention relates to a radar that emits a radio wave and detects the presence of an object and a distance to the object and so forth by reflection waves therefrom.

2. Background Art

Radars have been used in various fields to measure distances to objects, etc. In the automobile industry, for example, active efforts have been poured in the developments of on-vehicle radars for measuring distances from preceding vehicles.

Such radars are classified into various systems according to the waveforms of radio waves in use. For example, in the "Development trend of on-vehicle millimeter wave radar", (pp977–pp981) in October issue 1996 from the Electronic Information Communication Association, are reported radars of various systems, such as pulse radar, two-frequency (Continuous Wave) radar, and FMCW (Frequency Modulated Continuous Wave) radar. The pulse radar is a radio that detects a distance to an object on the basis of the elapsed time from emission of a pulse wave to reception of the echo. The two-frequency CW radar is a radio that emits two continuous waves of different frequencies alternately, and detects a distance to an object and a relative velocity of the object on the basis of the Doppler shift of these echoes. The FMCW radar is a radio installation that emits a continuous wave to which is applied an appropriately repeated frequency modulation such as triangular wave frequency modulation, and detects a distance to an object and a relative velocity of the object on the basis of the beat frequency of the transmission signal and the reflection signal. Here, the two-frequency CW radar and the FMCW radar detect a distance to an object and a relative velocity of the object on the basis of the frequency and phase of a peak signal in the frequency spectra obtained by applying the FFT (Fast Fourier Transform) processing to a reception signal.

Japanese Patent Laid-open No. 2000-46932 discloses the configuration of an FMCW radar that makes the resolution variable by varying the transmission bandwidth and frequency of a signal outputted from a CW oscillator under the condition that the number of sample data is constant. This FMCW radar realizes a mode to observe a wide range with a low resolution, and a mode to observe a narrow range with a high resolution.

DISCLOSURE OF INVENTION

The object of the invention is to provide a radar capable of detecting with high precision an object existing in an area of high importance for the purpose of surveillance, which has a configuration different from that of a conventional radar.

In order to accomplish this object, a radar in this invention is made to analyze a beat signal of a reception signal generated by receiving an echo from an object and a transmission signal into frequency components with at least two kinds of frequency resolutions.

Items contained in concrete constructions cited in the best mode for carrying out the invention shall possess as free combinations as possible, and any of the combinations shall constitute the invention. For example, a mode in which a construction cited as the best mode for carrying out the invention has a part thereof appropriately eliminated shall be one of the embodiments of the invention.

Each of the items contained in concretely shown constructions in the best mode to carry out the invention is a subordinate concept contained in a superordinate concept, in which a plurality of items having the same functions as those is generalized. Therefore, any can be replaced by another construction having the same function, and can be expressed as an overall means having the same function as that.

BRIEF DESCRIPTION OF DRAWINGS

FIG. 16 is a diagram explaining an effect of the processing that the microcomputer executes, relating to another embodiment of the invention;

BEST MODE FOR CARRYING OUT THE INVENTION

The best mode for carrying out the invention will be described with reference to the accompanying drawings.

First, a construction of a radar loaded in the front of an automobile, relating to the embodiment, will be described. Here, an example will be quoted in which the invention is applied to a homodyne two-frequency CW radar. This does not prevent the invention from being applied to a heterodyne two-frequency CW radar.

Figure 1:
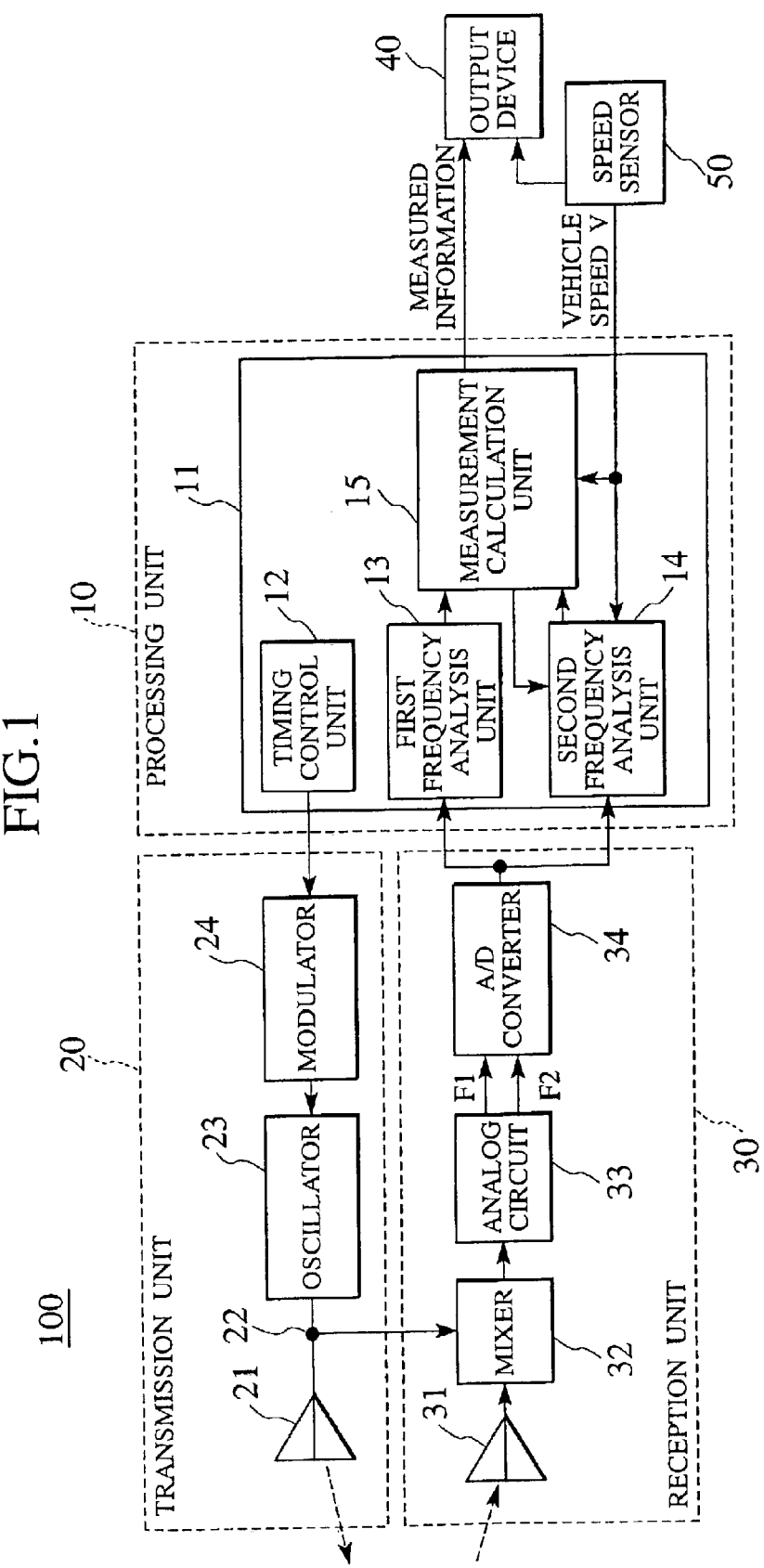
FIG. 1 is a block diagram illustrating a construction of a radar and its peripheral devices relating to one embodiment of the present invention.

As shown in FIG. 1, a radar 100 relating to the embodiment comprises a transmission unit 20 that emits a radio wave to an object, a reception unit 30 that receives reflection waves from the object, and a signal processing unit 10 that calculates a distance Range from the radar 100 to the object and a relative velocity Rate of the object to the radar 100.

Figure 2:
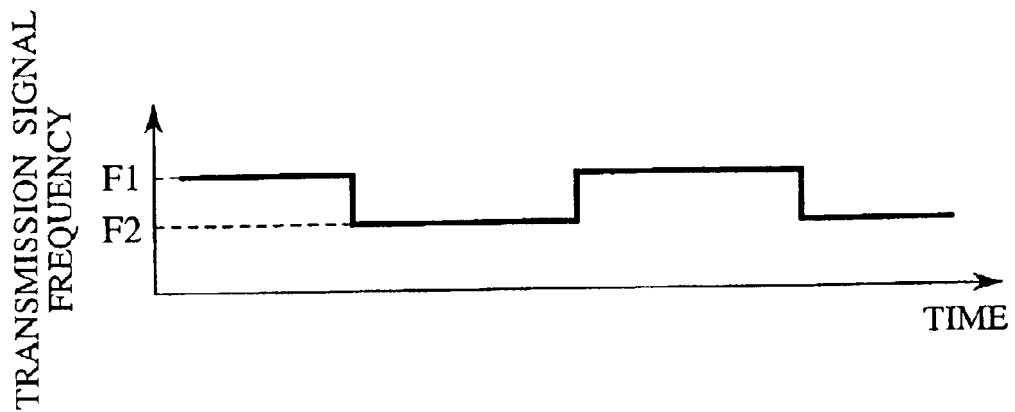
FIG. 2 is a diagram illustrating the frequency variations of a transmission signal from a two-frequency CW radar.

The transmission unit 20 includes a modulator 24 that alternately outputs two types of modulation signals according to a switching instruction from the signal processing unit 10; an oscillator 23 that outputs high frequency signals (for example, radio signals of millimeter waveband) of oscillation frequencies corresponding to the modulation signals from the modulator 24; a transmission antenna 21 that transmits the output of the oscillator 23 as a radio wave; and a directional coupler 22 that guides a part of the output of the oscillator 23 to the reception unit 30 as a reference signal of the frequency conversion. With this construction, the transmission antenna 21 of the transmission unit 20 alternately emits two continuous waves having mutually different oscillation frequencies $F_1$, $F_2$, as shown in FIG. 2.

Figure 3:
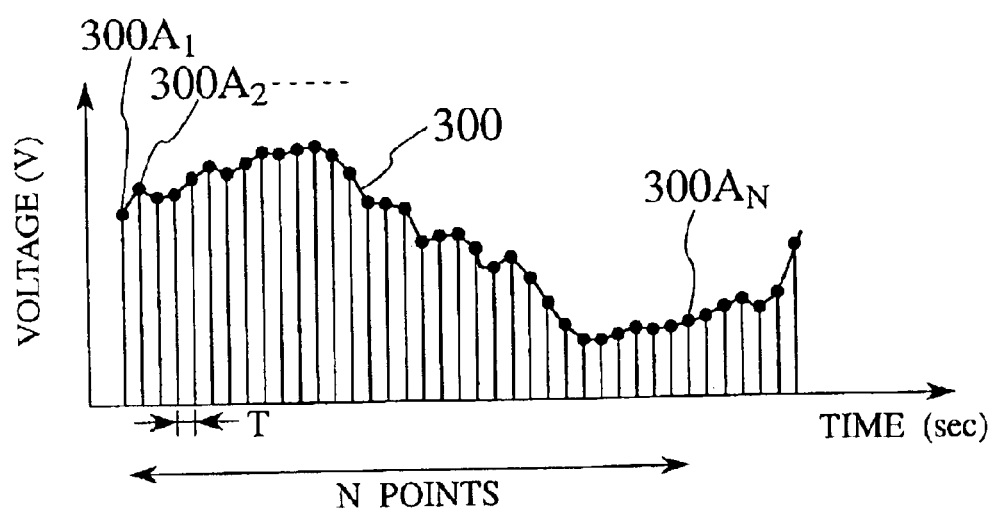
FIG. 3 is a diagram illustrating the relation between a signal input to an A/D converter and a signal output from the A/D converter.

The reception unit 30 includes a reception antenna 31 that receives echoes from an object; a mixer 32 that generates a beat signal by mixing a reception signal of the reception antenna 31 and a signal from the directional coupler 22; an analog circuit 33 that demodulates and amplifies the beat signal from the mixer 32 by oscillation frequency; and an A/D converter 34 that samples analog signals outputted from the analog circuit 33 by oscillation frequency at specific sampling intervals T [sec]. With this construction, the reception unit 30 converts the echoes from the object into intermediate frequencies, and then amplifying the intermediate frequencies by oscillation frequency, followed by detection of the frequencies. As shown in FIG. 3, the signal processing unit 10 receives, as the detection result, sampled signals $300A_1$, $300A_2$, ... $360A_N$, ... by the A/D converter 34 by oscillation frequency.

The signal processing unit 10 possesses a microcomputer 11 to which are connected a speed sensor S0 loaded in the vehicle and a device (for example, an output device 40) utilizing the calculation result of the signal processing unit 10. This microcomputer 11 implements the following functional components (a) through (n) by software.

The microcomputer 11 implements: (a) a timing control unit 12 that instructs the switching timing of the two oscillation frequencies $F_1$, $F_2$ to the modulator 24 and the analog circuit 33; (b) a first frequency analysis unit 13 that analyzes a detection result by the reception unit 30; (c) a second frequency analysis unit 14 that locally analyzes the detection result by the reception unit 30; (d) a measurement calculation unit 15 that calculates a distance Range to an object and a relative velocity Rate of the object, on the basis of a detection result of the first frequency analysis unit 13 or an analysis result of the second frequency analysis unit 14, and outputs a calculation result thereof to the output device 40.

Figure 4:
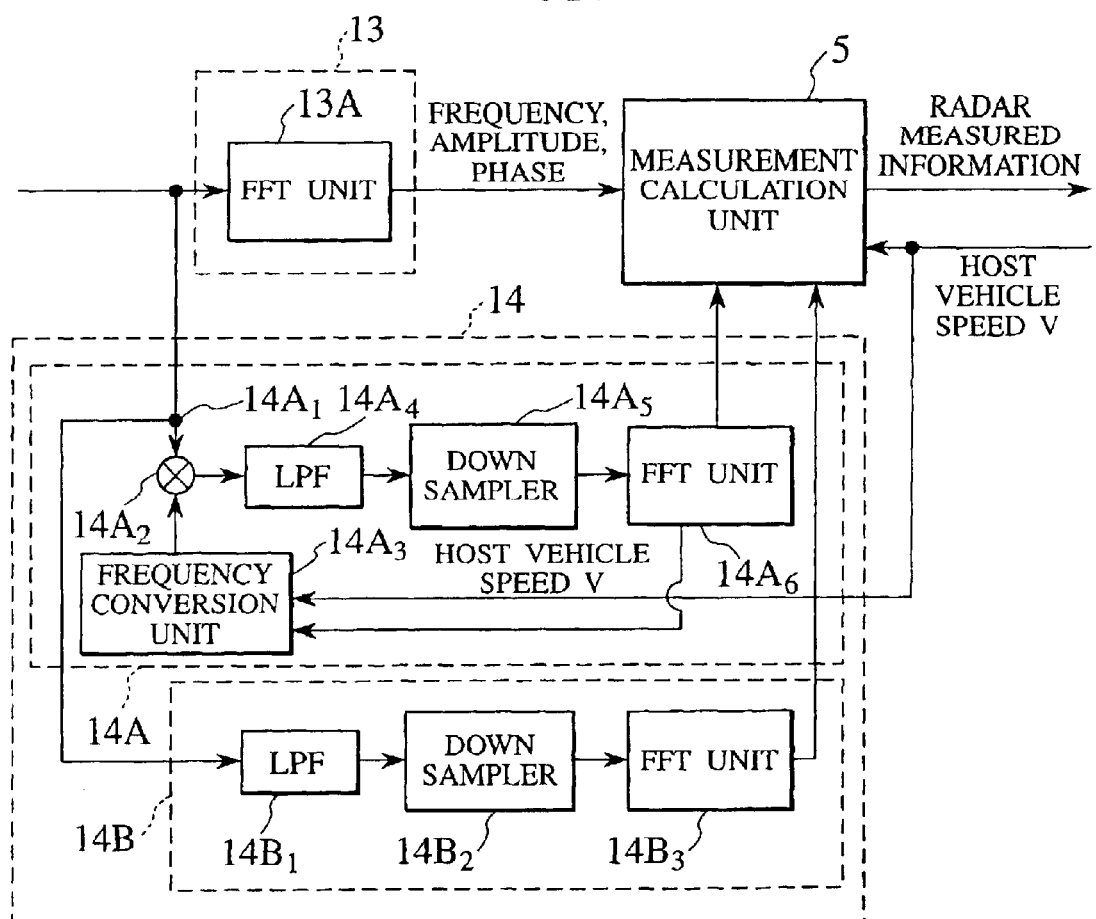
FIG. 4 is a block diagram illustrating a functional construction that a microcomputer realizes through software, relating to one embodiment of the invention.

Here, the first frequency analysis unit 13 includes, as shown in FIG. 4, (e) an FFT (Fast Fourier Transform) unit 13A that detects information necessary for calculating the distance Range to an object and the relative velocity Rate of the object on the basis of the sampled signals $300A_1$, $300A_2$, ..., $300A_N$, ... from the A/D converter 34. In addition, the second frequency analysis unit 14 includes a plurality of zooming processing units to analyze frequency bands different from each other (in this embodiment, a stopping object zooming processing unit 14A and a moving object zooming processing unit 14B). The stopping object zooming processing unit 14A includes: (f) a frequency conversion unit $14A_3$ that generates a reference frequency signal f by a frequency conversion of a speed data V from the speed sensor 50; (g) a mixer $14A_2$ that mixes the sampled signals from the A/D converter 34 and the reference frequency signal from the frequency conversion unit $14A_3$; (h) a directional coupler $14A_1$ that guides part of the sampled signals from the A/D converter 34 to the other zooming processing unit 14B; (i) a LPF (Low Pass Filter) $14A_4$ that removes high frequency components from an output signal of the mixer $14A_2$; (j) a down sampler $14A_5$ that down samples an output signal of the LPF $14A_4$; (k) an FFT (Fast Fourier Transform) unit $14A_6$ that detects the information necessary for calculating the distance Range to an object and the relative velocity Rate of the object on the basis of the sampled signals from the down sampler $14A_5$. The moving object zooming processing unit 14B includes (1) a LPF (Low Pass Filter) $14B_1$ that removes high frequency components from an output signal of the directional coupler $14A_1$; (m) a down sampler $14B_2$ that down samples an output signal of the LPF $14B_1$; (n) an FFT (Fast Fourier Transform) unit $14B_3$ that detects the information necessary for calculating the distance Range to an object and the relative velocity Rate of the object on the basis of the sampled signals from the down sampler $14B_2$.

Figure 5:
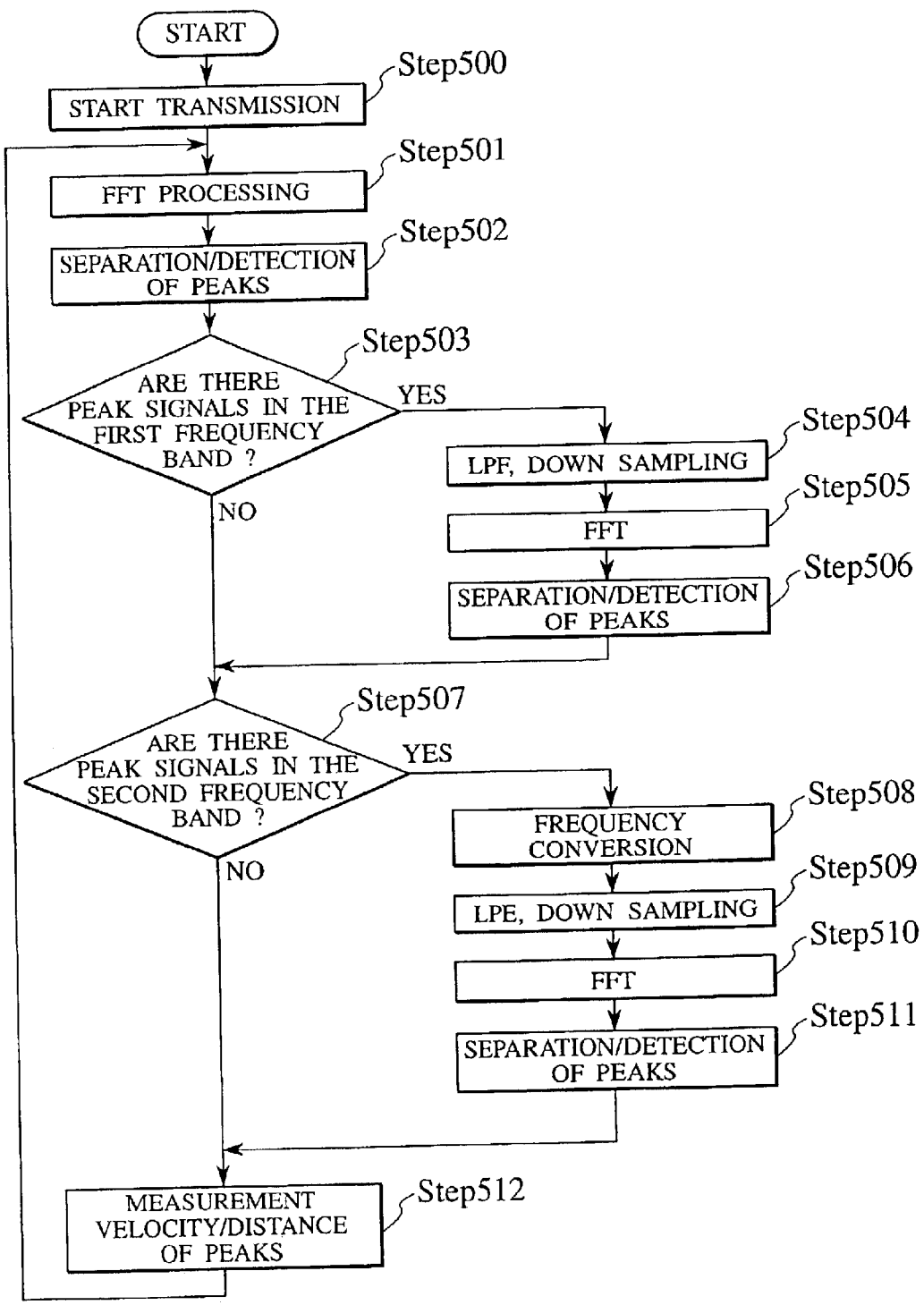
Fig. 5 is a flow chart of the processing that a microcomputer executes, relating to one embodiment of the invention.

Next, the processing that the microcomputer 11 executes, namely, the processing in which the functional components are implemented by means of the software will be described according to FIG. 5.

Figure 6:
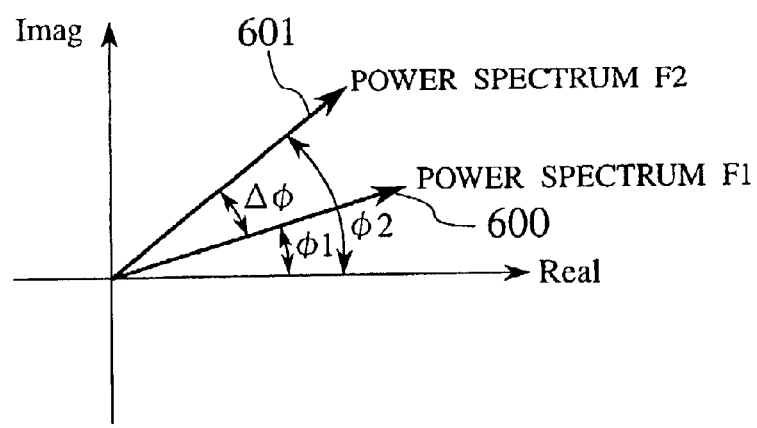
FIG. 6 is a diagram illustrating a frequency spectrum generated by an FFT.

First, the timing control unit 12 starts instruction of the switching timings of the two oscillation frequencies $F_1$, $F_2$ (Step 500). From then on, this alternately periodically gives the instruction of the switching timing of the two oscillation frequencies $F_1$, $F_2$ to the modulator 24 of the transmission unit 20 and the analog circuit 33 of the reception unit 30. Therefore, from then on, the transmission unit 20 transmits the continuous waves of the two oscillation frequencies $F_1$, $F_2$ alternately, periodically, and the reception unit 30 detects the echoes from the object for each of the oscillation frequencies $F_1$, $F_2$ When the reception unit 30 starts the detection of the echoes from the object, the FFT unit 13A of the first frequency analysis unit 13 fetches the sampled signals $300A_1$, $300A_2$, ..., $300A_N$, ... from the A/D converter 34 of the reception unit 30 on N pieces basis by oscillation frequency, and analyzes the N pieces of the sampled signals $300A_1$, $300A_2$, ..., $300A_N$, ... into the frequency components by the Fast Fourier Transform (Step 501). Thus, after the frequency spectra of the frequency resolution 1/(N·T)[1/sec] are obtained by oscillation frequency, the FFT unit 13A detects each peaks of the frequency spectra by threshold processing, and outputs the frequencies $f_{d1}$, $f_{d2}$ and the phases $\phi_1$, $\phi_2$ of each peak signals to the measurement calculation unit 15 as the information necessary for calculating the distance Range to an object and the relative velocity Rate of the object (Step502). Here, as shown in FIG. 6, the phases $\phi_1$, $\phi_2$ of the peaks of each frequency spectra are given by the angles formed by the real axis Real and peaks 600, 601 of each frequency spectra by the complex representation.

Thereafter, the measurement calculation unit 15 judges whether or not a first frequency band established to include the Doppler frequency by the transmission wave and the echoes from a moving object moving at the same speed as the radar 100 (for example, a frequency band of an appropriate bandwidth, set to include 0 Hz) includes the average value $(f_{d1}+f_{d2})/2$ of the frequencies $f_{d1}$, $f_{d2}$ of the two peak signals detected by the first frequency analysis unit 13 (Step 503); the measurement calculation unit 15 judges whether or not a second frequency band established to include the Doppler frequency by the transmission wave and the echoes from a stopping object (for example, a frequency band of an appropriate bandwidth, set by a speed corresponding to the relative velocity of the stopping object to the radar) includes the average value $(f_{d1}+f_{d2})/2$ of the frequencies $f_{d1}$, $f_{d2}$ of the peak signals detected by oscillation frequency by the first frequency analysis unit 13 (Step 507).

As the result, if the average value $(f_{d1}+f_{d2})/2$ of the frequencies $f_{d1}$, $f_{d2}$ of the peak signals detected by oscillation frequency by the first frequency analysis unit 13 is included in these frequency bands, the second frequency analysis unit 14 reanalyzes the beat signal into frequency components with a finer frequency resolution than that of the first frequency analysis unit 13, and detects again the information necessary for calculating the distance Range to an object and the relative velocity Rate of the object. Concretely, the processing is executed as follows.

If the average value $(f_{d1}+f_{d2})/2$ of the frequencies $f_{d1}$, $f_{d2}$ of the peak signals detected by oscillation frequency by the first frequency analysis unit 13 is included in the first frequency band, the following processing (Step 504 through Step 506) are executed in the moving object zooming processing unit 14B of the second frequency analysis unit 14.

Figure 7:
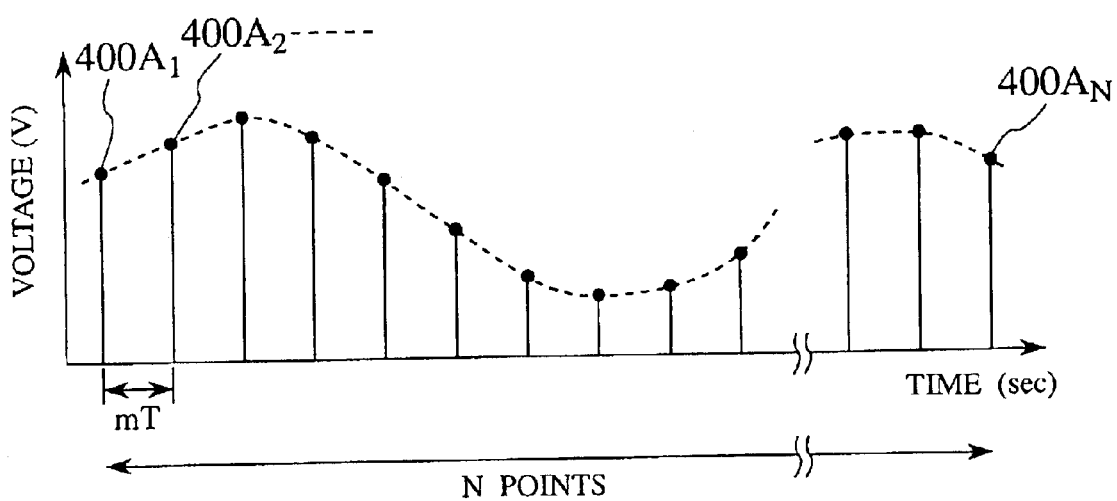
FIG. 7 is a diagram illustrating the relation between a signal input to a down sampler and a signal output from the down sampler.

First, the LPF 14B$_1$ removes the high frequency components from the sampled signals outputted from the A/D converter 34 for each of the oscillation frequencies $F_1$, $F_2$. Thereafter, the down sampler 14B$_2$ down samples the output signal from the LPF 14B$_1$ (Step 504). Thus, as shown in FIG. 7, the sampled signals 400A$_1$, 400A$_2$, ..., 400A$_N$, ... being sampled at the sampling intervals m·T[sec], m times the sampling interval T[sec] of the A/D converter 34, are generated by oscillation frequency.

Thereafter, the FFT unit 14B$_3$ fetches the sampled signals from the down sampler 14B$_2$ on N pieces basis by oscillation frequency, and analyzes the sampled signals 400A$_1$, 400A$_2$, ... 400A$_N$, ... into the frequency components by the Fast Fourier Transform (Step 505). Thus, the frequency spectra of a finer frequency resolution 1/(N·m·T)[1/sec] than the spectra generated by the FFT unit 13A of the first frequency analysis unit 13 are obtained by oscillation frequency. Further, the FFT unit 14B$_3$ detects each peak signals of the frequency spectra by the threshold processing, and outputs the frequencies $f_{d1}$, $f_{d2}$ and the phases $\phi_1$, $\phi_2$ of each peak signals to the measurement calculation unit 15 as the information necessary for calculating the distance Range to an object and the relative velocity Rate of the object (Step 506).

If the average value $(f_{d1}+f_{d2})/2$ of the frequencies $f_{d1}$, $f_{d2}$ of the peak signals detected by oscillation frequency by the first frequency analysis unit 13 is included in the second frequency band, the following processing (Step 508 through Step 511) are executed in the stopping object zooming processing unit 14A of the second frequency analysis unit 14.

First, the frequency conversion unit 14A$_3$ generates a reference frequency signal f corresponding to the Doppler frequency of the echoes from the stopping object, based on the speed data V from the speed sensor 50 by the frequency conversion using the following expression (1).

$$f=(2\cdot fc/c)V \ldots \quad (1)$$

Here, c represents the velocity of light, and $f_c$ represents the average value $(F_1+F_2)/2$ of the oscillation frequencies $F_1$, $F_2$ (the same in the following expressions).

Thereafter, the mixer 14A$_2$ sequentially mixes the reference frequency signal f with the sampled signals outputted from the A/D converter 34 by oscillation frequency (Step 508). By this mixing, the frequency variations based on the reference frequency signal f are extracted from the frequency components of the echoes received by the reception antenna, and only the moving object traveling along with the host vehicle can be detected accordingly.

Further, the LPF 14A$_4$ removes the high frequency components from the output signal of the mixer 14A$_2$, and then, the down sampler 14A$_5$ down samples a signal from which the high frequency components are removed (Step 509). Thus, the sampled signals being sampled at the sampling intervals m·T[sec], m times the sampling interval T[sec] of the A/D converter 34, are generated by oscillation frequency.

Then, the FFT unit 14A$_6$ fetches the sampled signals on N pieces basis by oscillation frequency, and analyzes the group of sampled signals into the frequency components by the Fast Fourier Transform (Step 510). Thus, the frequency spectra of a finer frequency resolution 1/(N·m·T)[1/sec] than the spectra generated by the FFT unit 13A of the first frequency analysis unit 13 are obtained by oscillation frequency. Further, the FFT unit 14A$_6$ detects each of the peaks of the frequency spectra by the threshold processing, and outputs the frequencies $f_{d1}$, $f_{d2}$ and the phases $\phi_1$, $\phi_2$ of each of the peak signals to the measurement calculation unit 15 as the information necessary for calculating the distance Range to an object and the relative velocity Rate of the object (Step 511).

In the above processing, if there is an output from the second frequency analysis unit 14, the measurement calculation unit 15 calculates the distance Range to an object and the relative velocity Rate of the object on the basis of the output information; if there is not an output from the second frequency analysis unit 14, the measurement calculation unit 15 calculates the distance Range to an object and the relative velocity Rate of the object on the basis of the output information from the first frequency analysis unit 13 (Step 512). Concretely, they are calculated by the following expressions (2), (3).

$$\text{Rate}=(c\cdot fd)/(2\cdot fc) \ldots \quad (2)$$

$$\text{Range}=(c\cdot\Delta\phi)/(4\pi\Delta F) \ldots \quad (3)$$

Here, $f_d$ represents the average value $(f_{d1}+f_{d2})/2$ of the frequencies $f_{d1}$, $f_{d2}$ (Doppler frequencies) of the peak signals detected by oscillation frequency, $\Delta\phi$ the phase difference $(\phi_1-\phi_2)$ of the peak signals detected by oscillation frequency, and $\Delta F$ the difference $(F_1-F_2)$ of the oscillation frequencies $F_1$, $F_2$ (the same in the following expressions).

Then, the calculation results Range, Rate of the measurement calculation unit 15 are inputted as the measured information to the devices that use the results. For example, an input of the measured information as a feedback signal to a travel control device that controls a distance from a preceding vehicle will make it possible to enhance the safety in traveling a vehicle. An input of the measured information to the output device 40 that outputs a warning message to a driver will make the driver precisely grasp the distance and so forth to a stopping object, including an object that travels at about the same speed as the host vehicle if any, through a warning message from the output device. If there is not such an object, it is possible to roughly grasp the distances and so forth to other objects through the message from the output device. These two types of the devices will be described in detail later.

According to the foregoing processing, by analyzing the beat signal into frequency components with a comparably rough frequency resolution, the surrounding environments are detected roughly. Moreover, if any stopping objects are recognized to be present in the surrounding environments, the beat signal is analyzed into frequency components with a finer frequency resolution so as to precisely discriminate the individual stopping objects. Further, if a moving object that travels at about the same speed as the radar is recognized to be present, the beat signal is analyzed in the same manner into frequency components with a finer frequency resolution so as to precisely discriminate the individual moving objects. Thus, individual stopping vehicles being possible obstacles on travel and individual preceding vehicles from which the distances have to be maintained, etc., can be detected precisely.

Figure 8:
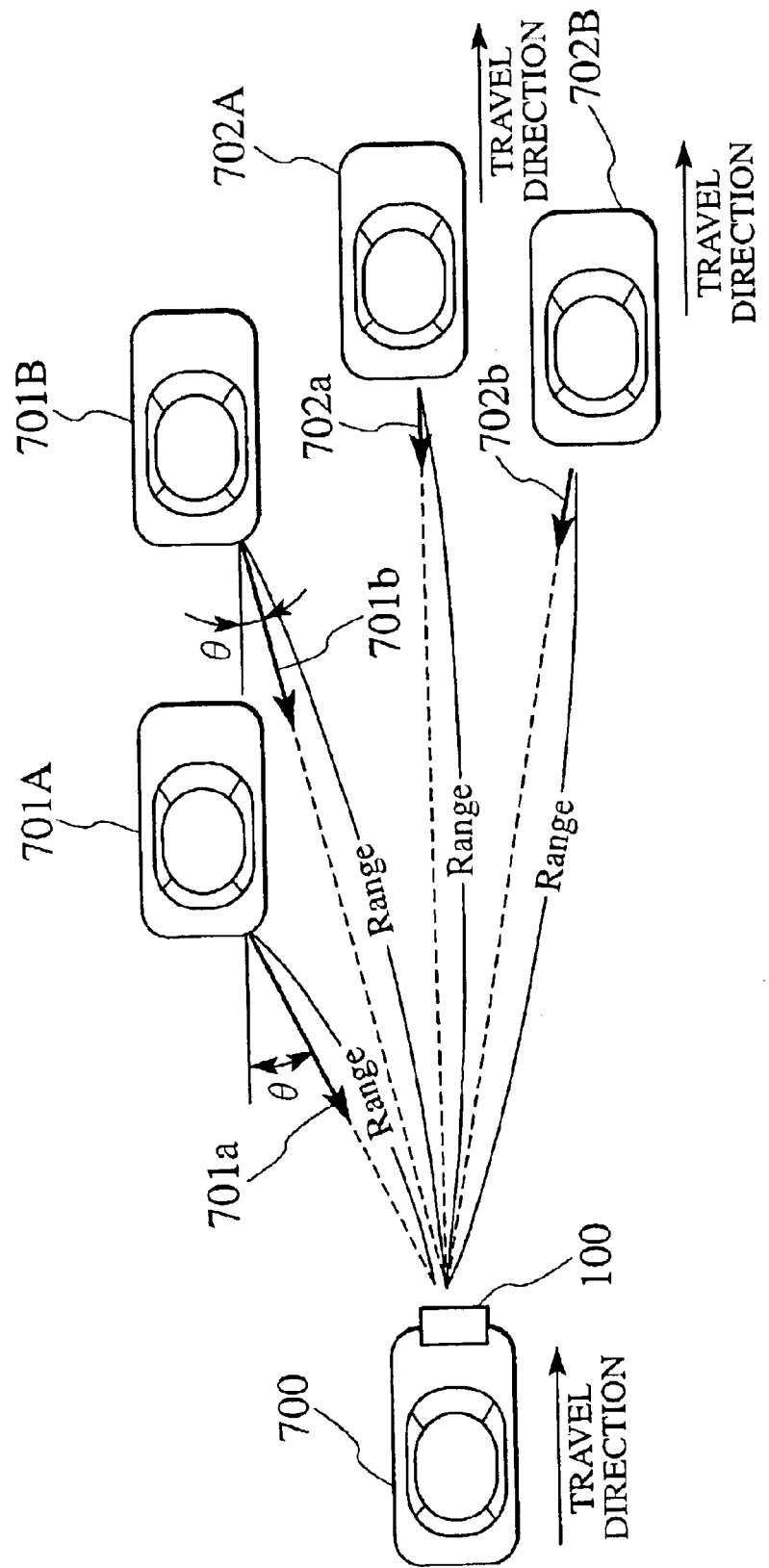
FIG. 8 is a diagram illustrating an example of positional relations between a vehicle loaded with the radar relating to one embodiment of the invention and other vehicles.

On the assumption of the road conditions as shown in FIG. 8, the effects will be explained more concretely.

Ahead of a vehicle 700 loaded with the radar 100 are two vehicles 702A, 702B in travel and two vehicles 701A, 701B in stop on the shoulder. Under such conditions, the reception antenna 31 of the reception unit 30 receives respective echoes 702a, 702b from the two vehicles 702A, 702B that are traveling at about the same speed, and respective echoes 701a, 701b from the two stopping vehicles 701A, 701B. Now, the frequency spectra generated by the first frequency analysis unit 13 by the oscillation frequencies $F_1$, $F_2$ each have two peaks 800A, 801A, as shown in FIG. 9(A). The peak 800A contained in the first frequency band 800 including 0 Hz is created by the echoes 702a, 702b from the two traveling vehicles 702A, 702B. The peak 801A contained in the second frequency band 801 including the reference frequency f determined according to the speed V of the vehicle 700 is created by the echoes 701a, 701b from the two stopping vehicles 701A, 701B.

However, since there is hardly a chance that the relative velocities Rate of the vehicle 700 loaded with the radar 100 and the two traveling vehicles 702A, 702B coincide perfectly, there should be a phase shift between a beat signal created by the transmission signal and the reflection signal 702a from the one traveling vehicle 702A and a beat signal created by the transmission signal and the reflection signal 702b from the other traveling vehicle 702B. This is also found from the relation given by the expression (3).

Also, since there is hardly a chance that the angles (θ in FIG. 8) formed by the traveling direction of the vehicle 700 loaded with the radar 100 and the propagating directions of the echoes 701a, 701b of the two stopping vehicles 701A, 701B coincide perfectly, there should be a shift between a Doppler frequency fd created by the transmission waves and the echo 701a from the one stopping vehicle 701A and a Doppler frequency $f_d$ created by the transmission waves and the echo 701b from the other stopping vehicle 701B. This is also found from the relation given by the following expression (4).

$$fd=\{(2\cdot fc)/c\}V\cos\theta \ldots \quad (4)$$

Accordingly, in the two zooming processing units 14A, 14B of the second frequency analysis unit 14, the beat signals are reanalyzed into frequency components with a finer frequency resolution than the frequency spectra generated by the first frequency analysis unit 13. As the result, in the stopping object zooming processing unit 14A, as shown in FIG. 9C, the frequency spectra in the first frequency band 801 are extracted for each of the oscillation frequencies $F_1$, $F_2$; in the moving object zooming processing unit 14B, as shown in FIG. 9B, the frequency spectra in the second frequency band 800 are extracted for each of the oscillation frequencies $F_1$, $F_2$. These frequency spectra each clearly show the two peaks created by the transmission wave and the echoes from individual vehicles. Concretely, in the frequency spectra in the second frequency band 800 (refer to FIG. 8(B)), a peak $800A_1$ created by the echo 702a from the one traveling vehicle 702A and the transmission wave, and a peak $800A_2$ created by the echo 702b from the other traveling vehicle 702B and the transmission wave are clearly separated; in the frequency spectra in the first frequency band 801 (refer to FIG. 8 (C)), a peak $801A_1$ created by the echo 701a from the one stopping vehicle 702A and the transmission wave, and a peak $801A_2$ created by the echo 701b from the other stopping vehicle 701B and the transmission wave are clearly separated. Therefore, the threshold processing to these spectra will securely detect the beat signals generated by the reflection signals from individual vehicles and the transmission signal, etc.

In this manner, the high-resolution frequency spectra created by the second frequency analysis unit can clearly discriminate the peaks created by the echoes from individual vehicles and the transmission wave. Therefore, it is possible to precisely detect the information necessary for calculating both the distances to the vehicles 701A, 701B, 702A, 702B, and the relative velocities Rate of the vehicles 701A, 701B, 702A, 702B. Accordingly, in a state that vehicles are mutually present in a close distance, that is, a plurality of vehicles is in tandem parking, or a plurality of vehicles travels in rows, even a slight difference between each of the vehicles and the radar can be detected precisely.

In the foregoing embodiment, the first frequency band is fixed, and the second frequency band is made to vary according to the vehicle speed. However, the construction may be made such that a driver can set the first frequency band and the second frequency band.

Now, a device will be described which utilizes the measured information Range, Rate outputted from the measurement calculation unit 15 of the processing unit 10. Here, the constructions of the foregoing two types of devices will be described.

Figure 18:
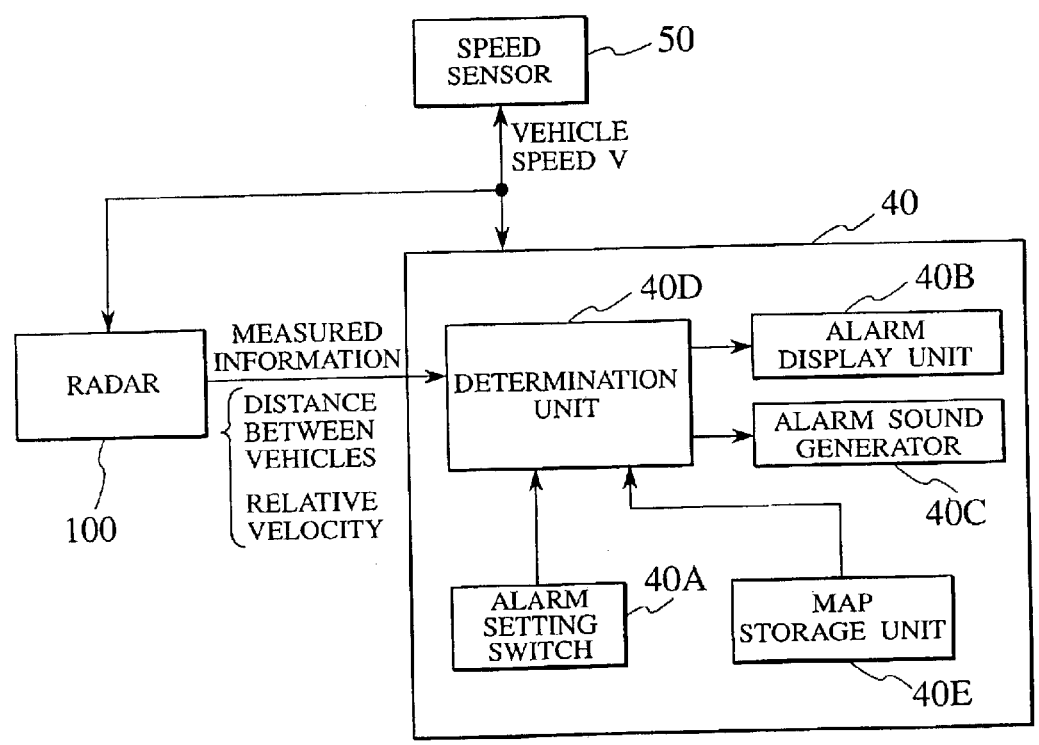
FIG. 18 is a block diagram illustrating a schematic construction of an output device that utilizes the output of the radar relating to the embodiment of the invention.

First, the output device 40 using the measured information Range, Rate from the radar 100 will be described with reference to FIG. 18.

The output device 40 includes an alarm setting switch 40A by which a driver or the like sets a level to generate an alarm; an alarm display unit 40B including a display for giving an alarm message; an alarm sound generator 40C including a speaker emitting an alarm sound, map storage unit 40E in which an alarm generation condition map is stored; and a determination unit 40D that judges the necessity of generating an alarm on the basis of the alarm generation condition map.

Figure 19:
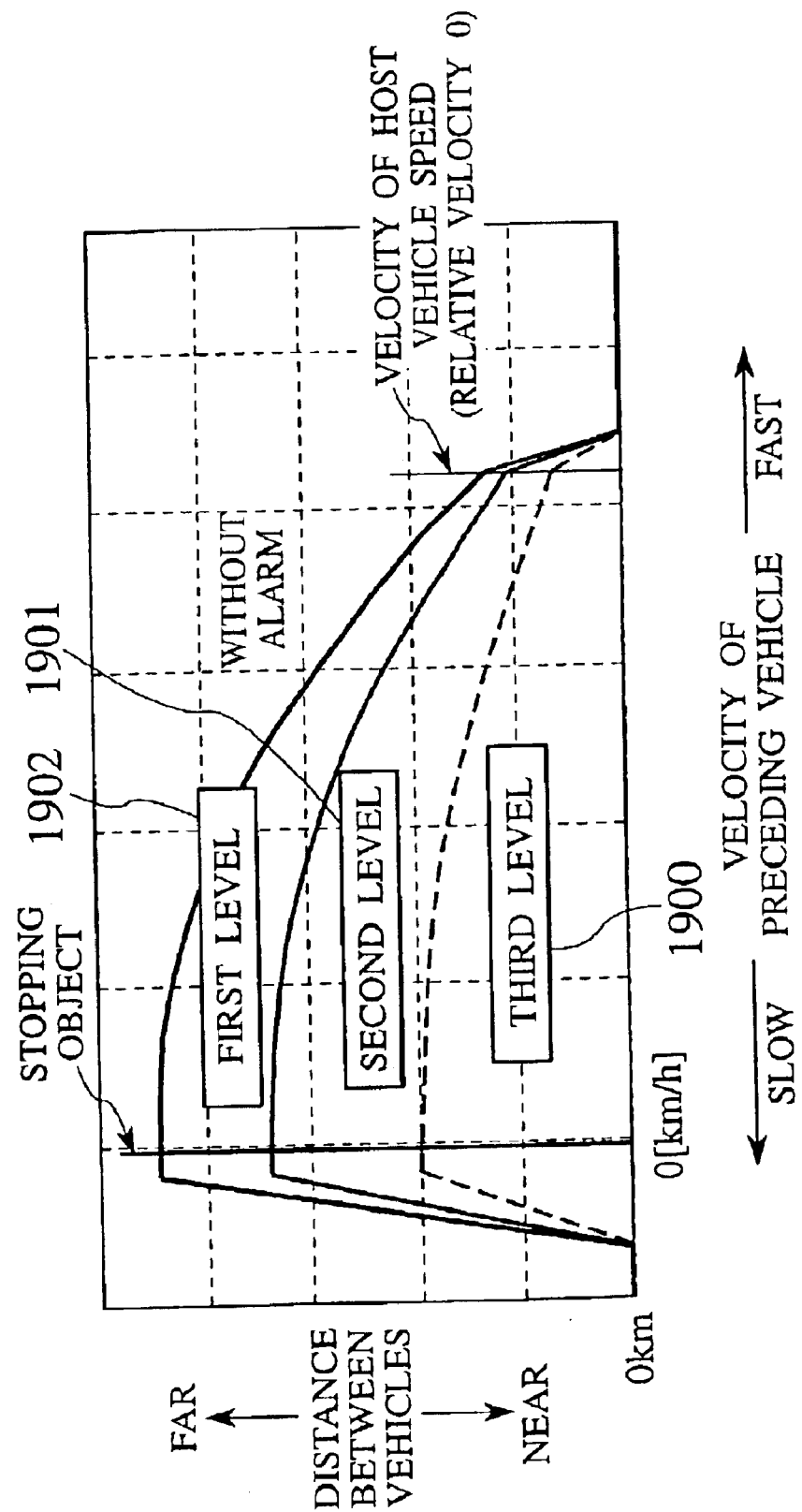
FIG. 19 is a diagram illustrating conceptually a data structure of the warning condition map used for judging the necessity of emitting a warning.
Figure 20:
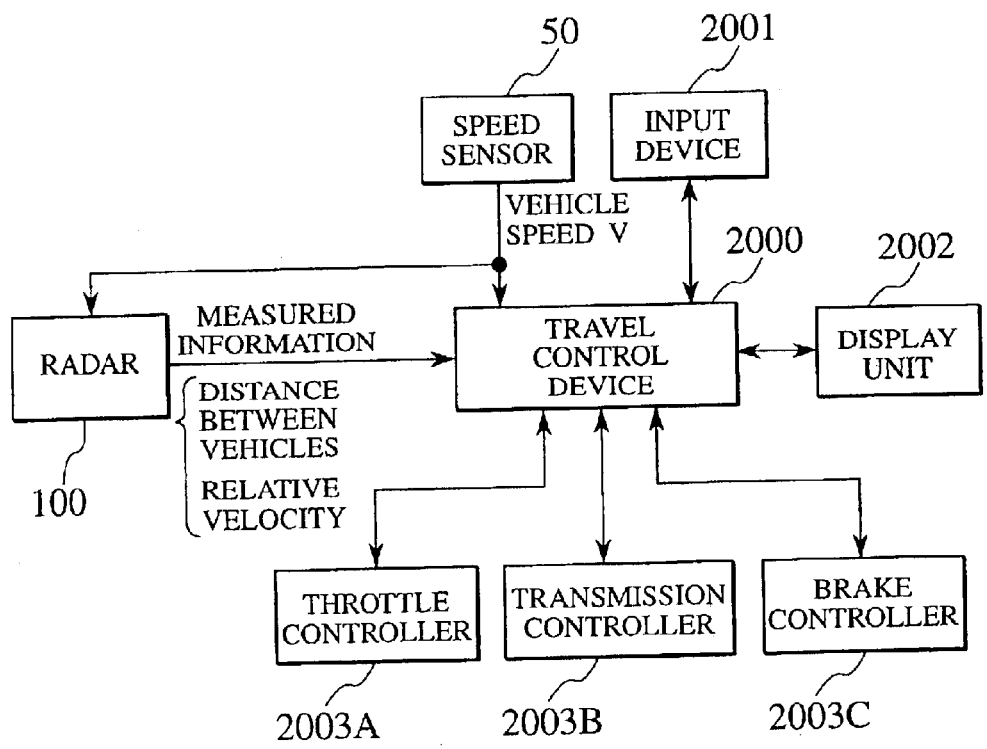
FIG. 20 is a block diagram illustrating a schematic construction of a device for controlling distances between vehicles that utilizes the output of the radar relating to the embodiment of the invention.

The alarm generation condition map shows the ranges 1900, 1901, 1902 of distances between vehicles that require generating an alarm of each alarm generation level for each of the velocities of preceding vehicles, as shown in FIG. 19. For example, in a case where the alarm generation level is the first level, if the velocity of the preceding vehicle is slower than that of the vehicle loaded with the radar, and if there exists a point determined by the current velocity of the preceding vehicle and the current distance between the vehicles in a region 1902 associated with the first level on the alarm generation condition map, the alarm generation is judged as necessary.

The determination unit 40D sequentially judges, while referring to this map, whether the relation with the preceding vehicles is a state of requiring alarm generation or not. If it judges the relation as a state of requiring alarm generation, it makes the alarm display unit 40B display the alarm message on the display thereof, and makes the alarm sound generator 40C emit sounds from the speaker thereof. The concrete processing is as follows. The determination unit 40 adds the vehicle speed data V from the speed sensor 40 to the relative velocity Rate contained in the measured information from the radar 100, and thereby calculates a preceding vehicle speed. Then, if this preceding vehicle speed is lower than the vehicle speed data V from the speed sensor 40, the determination unit 40D judges whether or not there exists a point determined by the distance Range contained in the measured information from the radar 10 and the vehicle speed data V from the speed sensor 40 in a region corresponding to the alarm generation level set by a driver, on the alarm generation condition map in FIG. 19. Then, if the point exists in the region corresponding to the alarm generation level set by the driver, the determination unit 40D makes the alarm display unit 40B display the alarm message indicating the effect on the display thereof, and makes the alarm sound generator 40C emit sounds from the speaker thereof with a sound level corresponding to the alarm generation level set by the driver.

Here in this case, when the determination unit 40D judges that the alarm generation is necessary, the alarm display unit 40B is made to display the alarm message. However, an LED may be lighted in place of the display of the alarm message or along with the display of the alarm message.

Next, a travel control device using the measured information Range, Rate from the radar 100 will be described based on FIG. 18.

To the travel control device 2000 are connected the radar 100, the speed sensor 50, an input device 2001 that receives a control start instruction and a control finish instruction from the driver, controllers to control actuators that vary driving forces of the vehicle loaded with the radar (for example, a throttle controller 2003A that controls a divergence of a throttle valve, a transmission controller 2003B that controls a divergence of a lockup solenoid valve and a divergence of a transmission solenoid valve, a brake controller 2003C that controls a brake actuator, etc.).

Until the time when the input device 2001 receives a control finish instruction after it has received a control start instruction, the travel control device 2000 calculates the target velocity and the target acceleration for maintaining the distances from preceding vehicles according to the current vehicle speeds and the like on the basis of the measured information Range, Rate from the radar 100 and the vehicle speed data V from the speed sensor 50. The calculation results are given as control instructions to the controllers 2003A, 2003B, and 2003C. If the distances from the preceding vehicles are elongated by the instructions, the various actuators are controlled so as to generate a driving force for the vehicle loaded with the radar; if in reverse the distances from the preceding vehicles are contracted, the various actuators are controlled so as to generate a braking force for the host vehicle. If the distances from the preceding vehicles are not varied, or if there do not exist the preceding vehicles, the various actuators are controlled so as to maintain the current driving force of the vehicle loaded with the radar. Thus, the ACC (Adaptive Cruise Control) is realized which maintains the distances from the preceding vehicles.

Further, the travel control device 2000 may be connected to a travel control device 2002 that displays the target velocity and target acceleration, as needed. It may also be connected to a navigation device, a yaw rate sensor, and so forth, and the output information from them may be applied to the ACC. Also, the constant value control function of the speed of the vehicle loaded with the radar may be added to the travel control device 2000, by receiving an input of the target vehicle speed from the driver through the input device 2001.

Incidentally, the two-frequency CW radar has been cited so far as an application example of this invention; however, the invention may be applied to the other radar, for example, an FMCW radar. Here, an example will be quoted in which the invention is applied to the homodyne. FMCW radar; however, this does not prevent the invention from being applied to a heterodyne FMCW radar.

Figure 12:
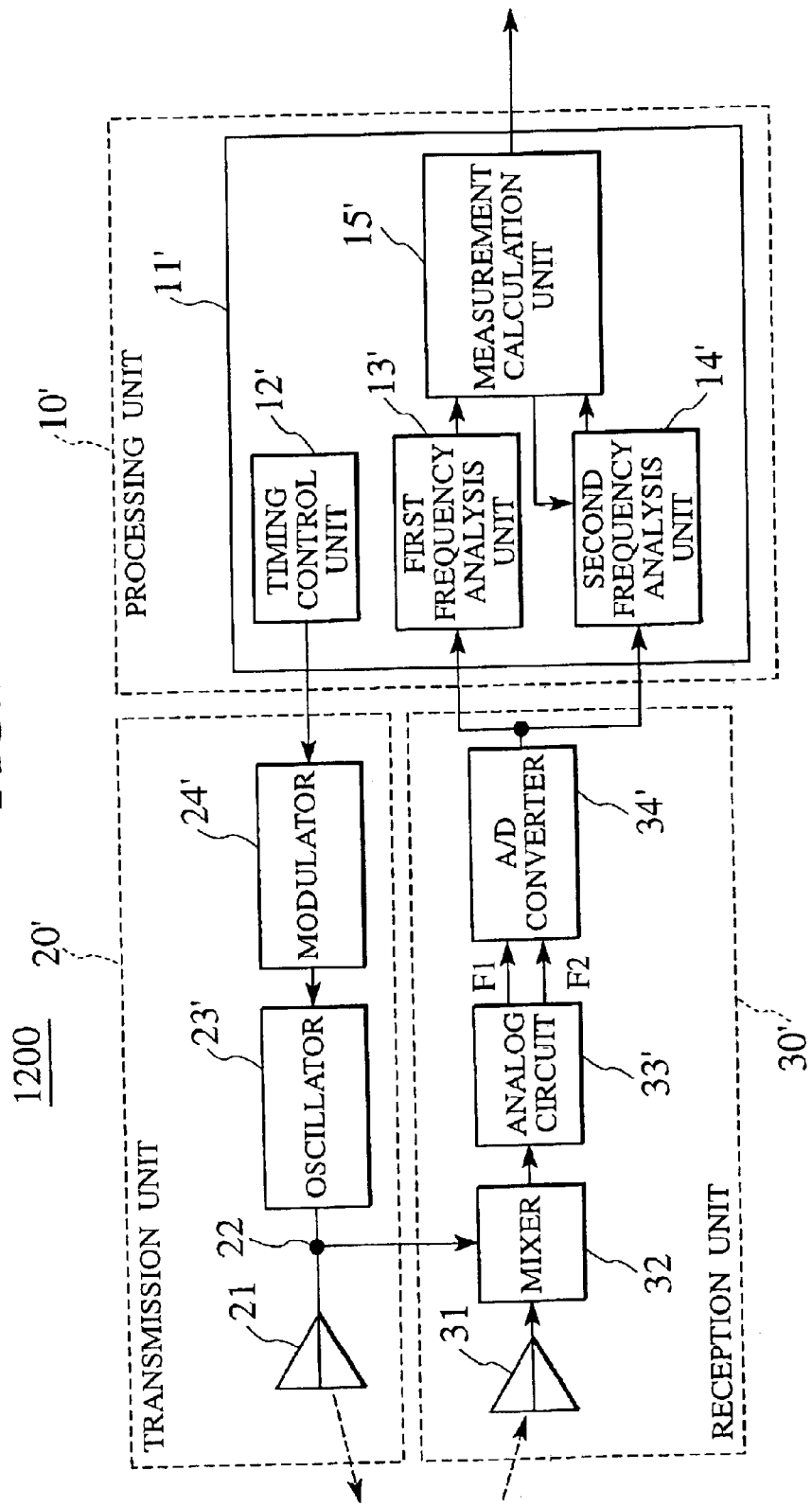
FIG. 12 is a block diagram illustrating a construction of a radar relating to another embodiment of the invention.

As shown in FIG. 12, in the same manner as the foregoing two-frequency CW radar, an FMCW radar 1200 relating to this embodiment includes the transmission unit 20 that emits a radio wave to an object; the reception unit 30 that receives reflection waves from the object; and the signal processing unit 10 that calculates a distance Range from the radar 1200 to the object and a relative velocity Rate of the object to the radar 1200. However, the processing in these units is different from those of the two-frequency CW radar. Therefore, the explanation will be made laying stress on the differences.

Figure 9:
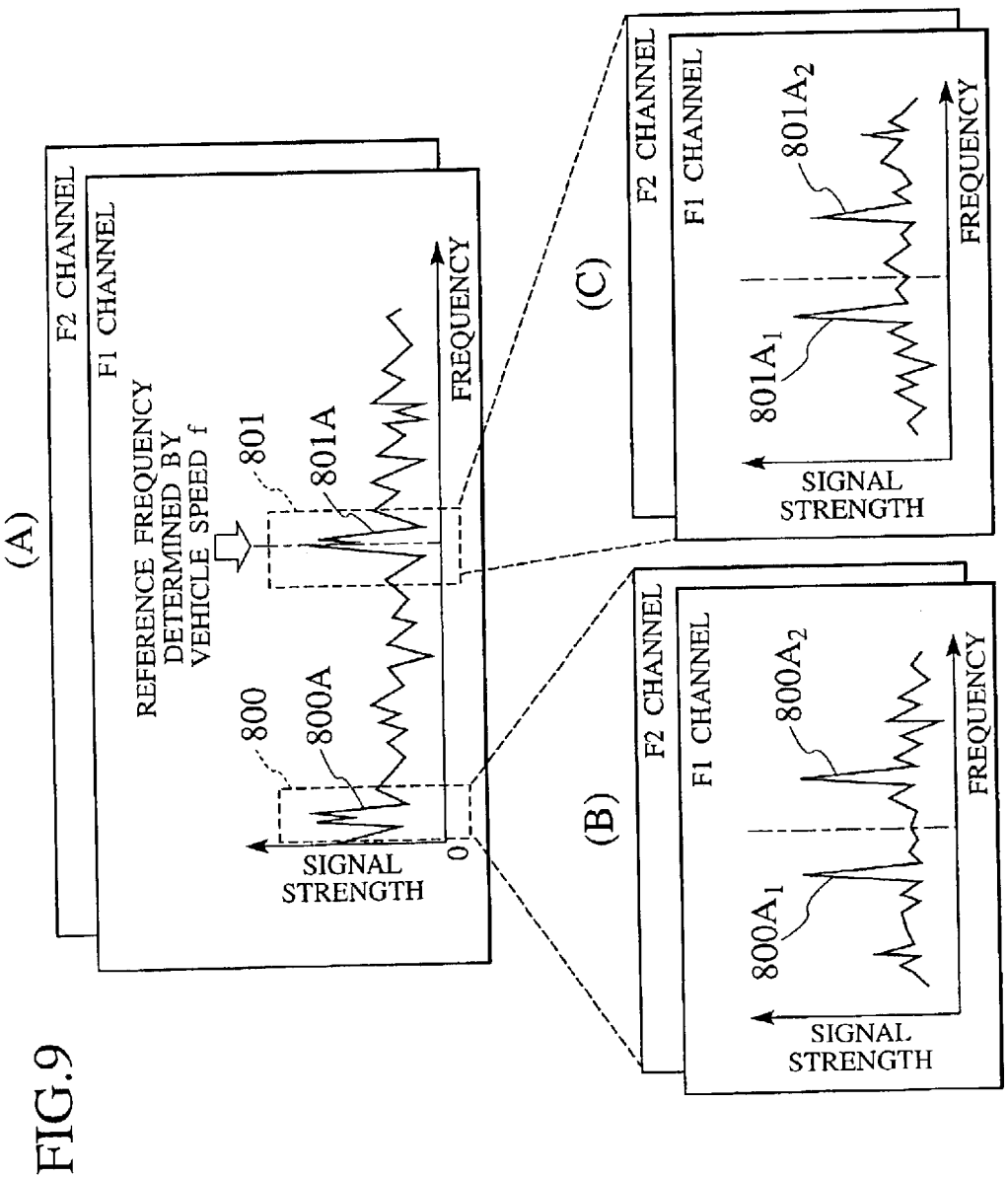
FIG. 9 is a diagram explaining an effect of the processing that the microcomputer executes, relating to one embodiment of the invention.

In the transmission unit 20, the oscillator 23 outputs a frequency signal that is repeatedly FM-modulated according to a triangular signal from the modulator 24. Thus, the transmission antenna 21 of the transmission unit 20 transmits a radio wave 900 subjected to a repeated modulation by the triangular, as shown in FIG. 9.

Figure 10:
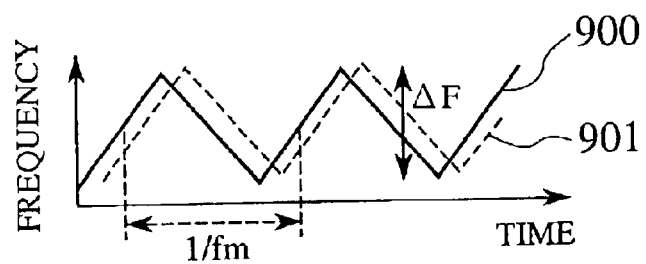
FIG. 10 is a diagram illustrating the frequency variations of a transmission signal from the FMCW radar, and the frequency variations of the echo thereof.
Figure 11:
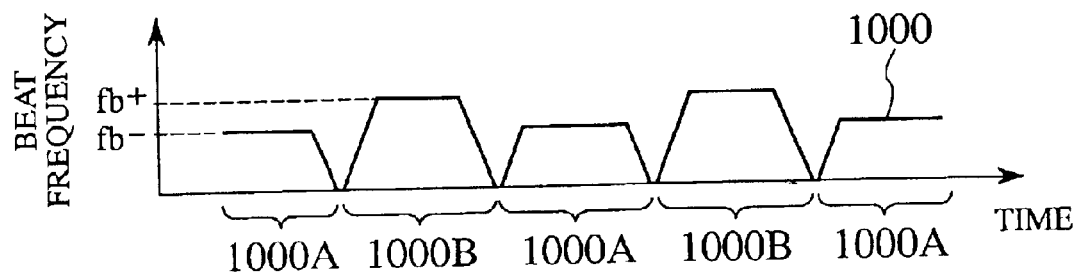
FIG. 11 is a diagram illustrating the frequency variations of a beat signal obtained by mixing the transmission signal and a reflection signal thereof from the FMCW radar.

In this case, if there exists an object in the transmission direction of the radio wave 900, first the reception antenna 31 in the reception unit 30 receives an echo 901 from the object as shown in FIG. 10, and the mixer 32 mixes the echo 901 with the radio wave 900 from the directional coupler 22. Thus, a beat signal 1000 is created such that two beat frequencies $f_{b+}$, $f_{b-}$ are alternately repeated at specified periods, as shown in FIG. 11. After the beat signal 1000 is demodulated and amplified by the analog circuit 33 every half cycles 1000A, 1000B of the repetition period, the resultant signal is sampled at specific sampling intervals T (refer to FIG. 3).

The signal-processing unit 10 possesses the microcomputer 11 to which a device utilizing the calculation result of the signal processing unit 10 (for example, the output device 40) and the like are connected. This microcomputer 11 implements the following functional components. That is, the microcomputer 11 implements: (a) a timing control unit 12 that instructs the reflecting timing of the triangular wave to the modulator 24 and the analog circuit 33, (b) the first frequency analysis unit 13 that analyzes a detection result by the reception unit 30, (c) the second frequency analysis unit 14 that locally analyzes the detection result by the reception unit 30, (d) the measurement calculation unit 15 that calculates a distance Range to an object and a relative velocity Rate of the object, on the basis of a detection result of the first frequency analysis unit 13 or an analysis result of the second frequency analysis unit 14, and outputs a calculation result thereof.

Figure 13:
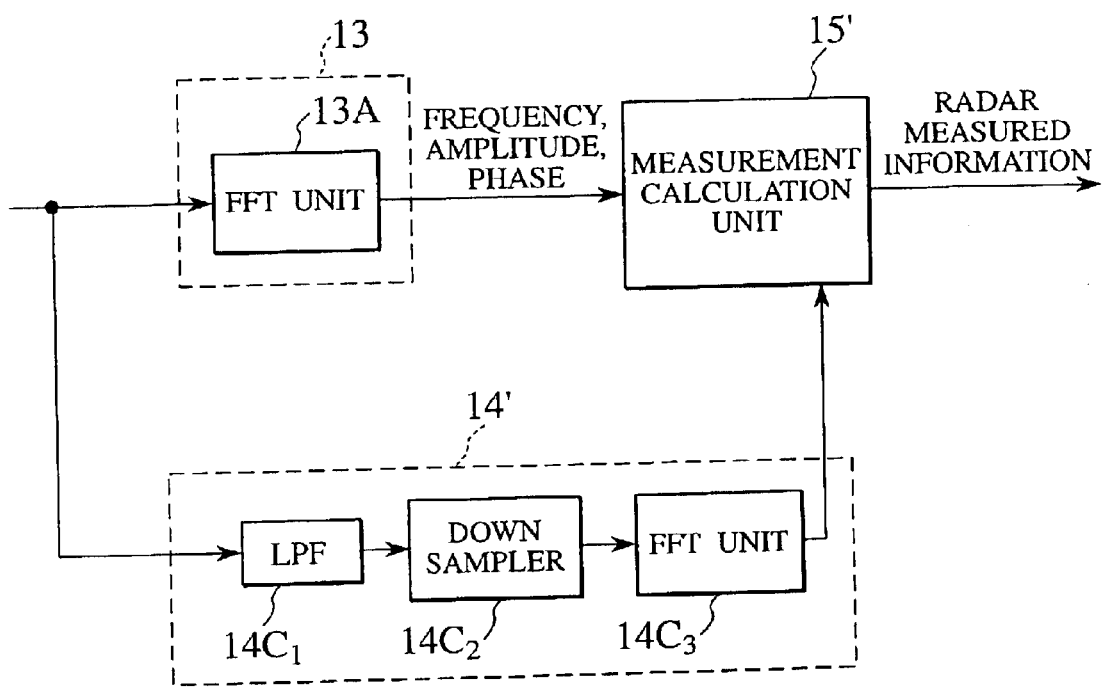
FIG. 13 is a block diagram illustrating a functional construction that a microcomputer realizes through software, relating to another embodiment of the invention.

Here, the first frequency analysis unit 13 includes, as shown in FIG. 13, (e) an FFT unit 13A that detects the information necessary for calculating the distance Range to an object and the relative velocity Rate of the object on the basis of the sampled signals from the A/D converter 34. The second frequency analysis unit 14 includes (o) a LPF (Low Pass Filter) $14C_1$ that removes high frequency components from the sampled signals from the A/D converter 34, (p) a down sampler $14B_2$ that down samples an output signal of the LPF $14C_1$, and (q) an FFT unit $14C_3$ that detects the necessary information for calculating the distance Range to an object lying within a specific range of distance from the radar 1200 and the relative velocity Rate of the object on the basis of the sampled signals from the down sampler $14B_2$.

Figure 14:
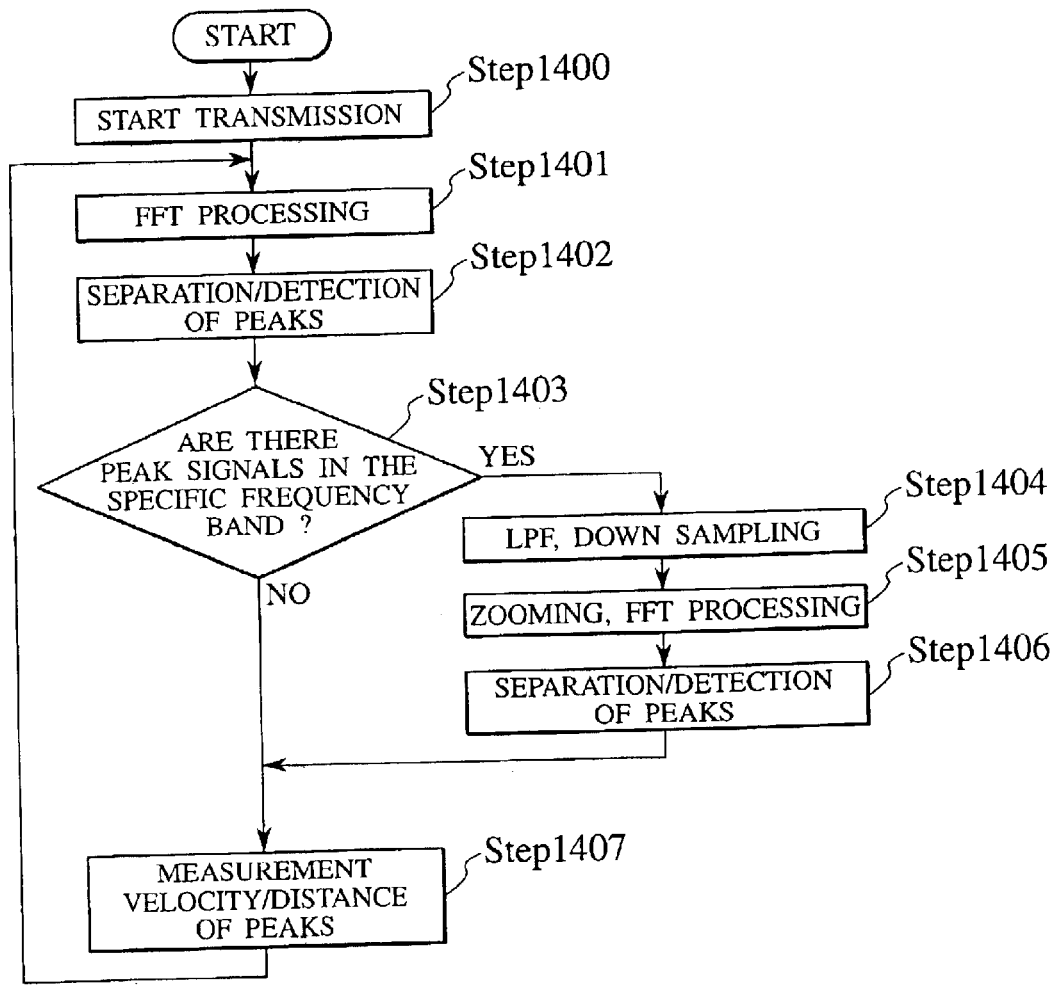
FIG. 14 is a flow chart of the processing that a microcomputer executes, relating to another embodiment of the invention.

Next, the processing that the microcomputer 11 of the FMCW radar 1200 executes, namely, the processing in which the functional components are implemented by means of the software will be described with reference to FIG. 14.

First, the timing control unit 12 starts the instruction of the reflecting timing of the triangular wave (Step 1400). From then on, this periodically gives the instruction of the reflecting timing of the triangular wave to the modulator 24 of the transmission unit 20 and the analog circuit 33 of the reception unit 30. Therefore, from then on the transmission unit 20 transmits the continuous wave repeatedly modulated with the triangular wave, and the reception unit 30 detects the echo from the object synchronously with the modulation cycle.

When the reception unit 30 starts the detection of the echo from the object, in the same manner as the two frequency CW radar, the FFT unit 13A of the first frequency analysis unit 13 analyzes the sampled signals from the A/D converter 34 of the reception unit 30 into frequency components by the Fast Fourier Transform every half cycles 1000A, 1000B of the repetition period of the beat signal 1000 (Step 1401). The peaks of the frequency spectra obtained by this processing are detected by threshold processing (Step 1402). Then, the frequencies $f_{b+}$, $f_{b-}$ of the peak signals are outputted to the measurement calculation unit 15 as the information necessary for calculating the distance Range to an object and the relative velocity Rate of the object.

Thereafter, the measurement calculation unit 15 judges whether or not the average value $(f_{b+}+f_{b-})/2$ of the frequencies $f_{b+}$, $f_{b-}$ of the frequencies detected by the first frequency analysis unit 13 is included in a specific frequency band of an appropriate bandwidth including 0 Hz (Step 1403). In a case of an FMCW radar, as an object is closer to the radar, a beat frequency created by a reflection signal therefrom and the transmission signal comes closer to 0 Hz. Therefore, the measurement calculation unit 15 judges here whether or not there exists an object within a specific range of distance from the radar.

As a result, if the average value $(f_{b+}+f_{b-})/2$ of the frequencies $f_{b+}$, $f_{b-}$ of the peak signals detected by oscillation frequency by the first frequency analysis unit 13 is included in the specific frequency band, as shown hereunder, the second frequency analysis unit 14 reanalyzes the beat signal into frequency components with a finer frequency resolution than the first frequency analysis unit 13, and detects again the information necessary for calculating the distance Range to an object and the relative velocity Rate of the object.

First, the LPF $14C_1$, removes the high frequency components from the sampled signals outputted from the A/D converter 34. Thereafter, the down sampler $14C_2$ down samples the output signal from the LPF $14C_1$ (Step 1404). Thereby, the sampled signals being sampled at the sampling intervals m·T[sec], m times the sampling interval T[sec] of the A/D converter 34, are generated (refer to FIG. 7).

Thereafter, the FFT unit $14C_3$ fetches the sampled signals from the down sampler $14C_2$ on N pieces basis every half cycles 1000A, 1000B of the repetition period of the beat signal 1000, and analyzes the sampled signals into the frequency components by the Fast Fourier Transform (Step 1405). Thus, the frequency spectra of a finer frequency resolution 1/(N·m·T)[1/sec] than the spectra generated by the FFT unit 13A of the first frequency analysis unit 13 are obtained. Further, the FFT unit $14C_3$ detects each peaks of the frequency spectra by the threshold processing, and outputs the frequencies $f_{b+}$, $f_{b-}$ of each of the peaks to the measurement calculation unit 15 as the information necessary for calculating the distance Range to an object and the relative velocity Rate of the object (Step 1406).

In the above processing, if there is an output from the second frequency analysis unit 14, the measurement calculation unit 15 calculates the distance to an object and the relative velocity of the object on the basis of the output information; if there is not an output from the second frequency analysis unit 14, the measurement calculation unit 15 calculates the distance Range to an object and the relative velocity Rate of the object on the basis of the output information from the first frequency analysis unit 13 (Step 1407). Concretely, they are calculated by the following expressions (5), (6).

$$\text{Rnage}=c \cdot (f_{b+}+f_{b-})/8 \cdot f \cdot fm \ldots \quad (5)$$

$$\text{Rate}=\lambda \cdot (f_{b+}-f_{b-})/4 \ldots \quad (6)$$

Here, $\Delta f$ represents the frequency deviation of the transmission signal (refer to FIG. 10), $f_m$ represents the repetition frequency of the transmission signal (refer to FIG. 10), and $\lambda$ represents the wavelength of the transmission signal.

Then, in the same manner as the two-frequency CW radar, the calculation results Range, Rate of the measurement calculation unit 15 are inputted as the measured result Range, Rate to the devices that use them.

According to the foregoing processing, by analyzing the beat signal into frequency components with a comparably rough frequency resolution, the surrounding environments are detected roughly. Then, if any objects are recognized to be present near the radar, the beat signal is analyzed into frequency components with a finer frequency resolution so as to precisely discriminate the individual objects. Therefore, it is possible to precisely detect obstacles to travel and so forth lying in a close range to which the driver needs to pay attention.

Figure 15:
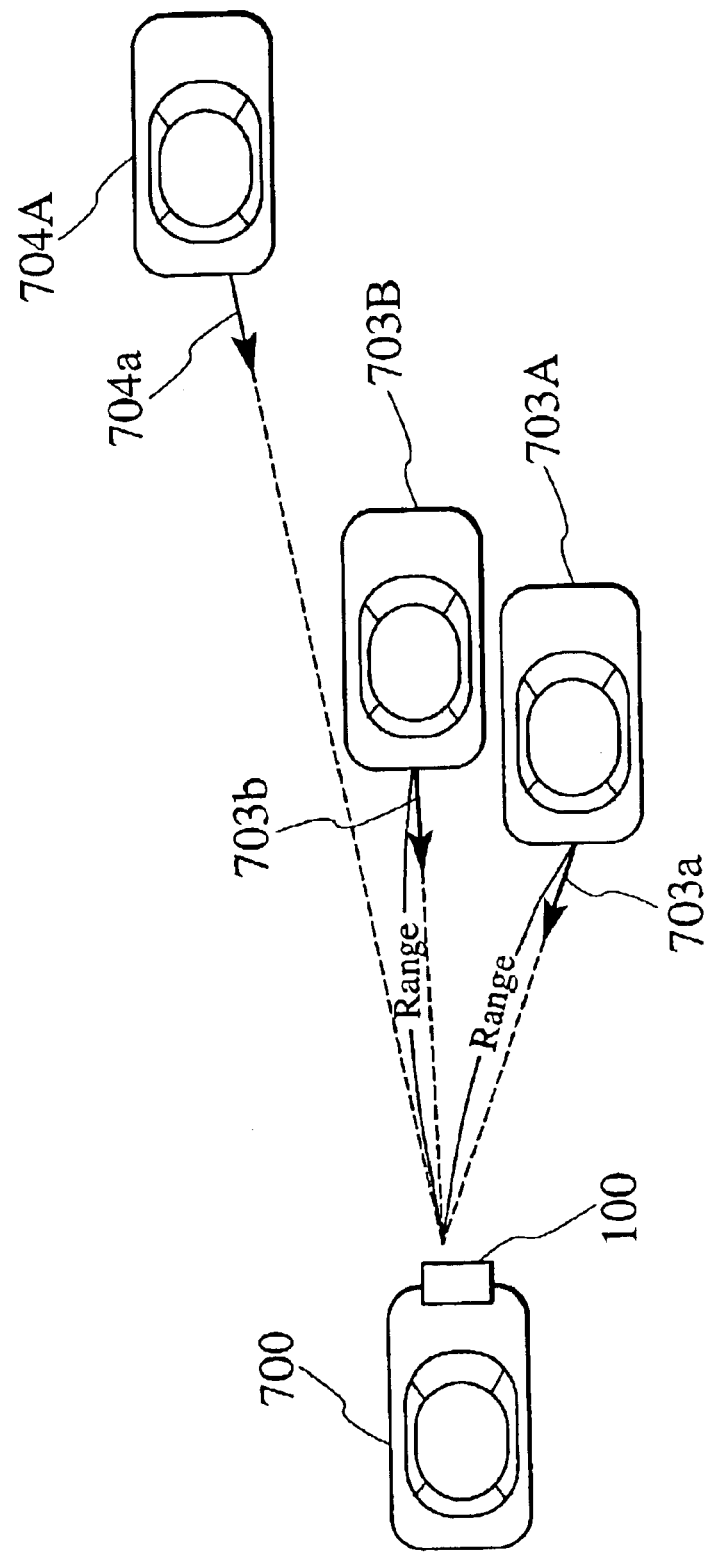
FIG. 15 is a diagram illustrating an example of positional relations between a vehicle loaded with the radar relating to another embodiment of the invention and other vehicles.

On the assumption of the road conditions as shown in FIG. 15, the effects will be explained more concretely.

Ahead of the vehicle 700 loaded with the radar 100 are three vehicles 703A, 703B, 704A in travel. Among them, only the vehicle 704 is traveling in an area remoter than a specific distance from the vehicle 700 loaded with the radar 100. Under such conditions, the reception antenna 31 of the reception unit 30 receives respective echoes 703a, 703b, 704a from the three vehicles 703A, 703B, 704A in travel.

Now, the frequency spectra generated by the first frequency analysis unit 13 have two peaks 1600A, 1601A, as shown in FIG. 16(A). The peak 1601A contained in a specific frequency band 1600 including 0 Hz is created by the echoes from the objects existing within the specific range from the radar 100, and the peak 1601A contained in a frequency band 1601 other than the former is created by the echo from the object located remotely more than a specific distance from the radar 100.

However in reality, the two vehicles 703A, 703B are traveling within the specific range from the vehicle 700 loaded with the radar 100. Accordingly, in the second frequency analysis unit 14, the beat signals are reanalyzed into frequency components with a finer frequency resolution than the frequency spectra generated by the first frequency analysis unit 13. As the result, as shown in FIG. 16(B), the frequency spectra in the specific frequency band 1600 are extracted every half cycles 1000A, 1000B of the repetition period of the beat signal 1000. These frequency spectra clearly show the two peaks created by the echoes from the individual vehicles being in the specific range from the radar 100. Concretely, a peak 1600A$_1$ created by the echo 703*a* from the one traveling vehicle 703A and the transmission wave, and a peak 1600A$_2$ created by the echo 703*b* from the other traveling vehicle 703B and the transmission wave are separated clearly. Therefore, the threshold processing to these spectra will securely detect the frequency of the beat signals generated by the transmission signal and the reflection signals from the individual vehicles being in the specific range from the radar.

In this manner, high-resolution frequency spectra created by the second frequency analysis unit can clearly discriminate the peaks created by the echoes from the individual vehicles being in the close range from the vehicle 700 loaded with the radar 1000. Therefore, it is possible to precisely detect the information necessary for calculating the distances Range to the vehicles 703A, 703B being in the close range from the vehicle 1200 and the relative velocities Rate of the vehicles 703A, 703B.

Here, it is premised that only when the peak frequency appears in the specific frequency band including 0 Hz, the peak signal is reanalyzed into frequency components with a finer frequency resolution. However, such processing is not necessarily required. For example, when a beat frequency appears in a frequency band other than the specific frequency band, to reanalyze the peak signal into frequency components with a finer frequency resolution will enhance the accuracy of detecting the object existing in a comparably long range from the radar.

In conclusion, a radar specification designed in consideration of actual road environments will be described.

Figure 21:
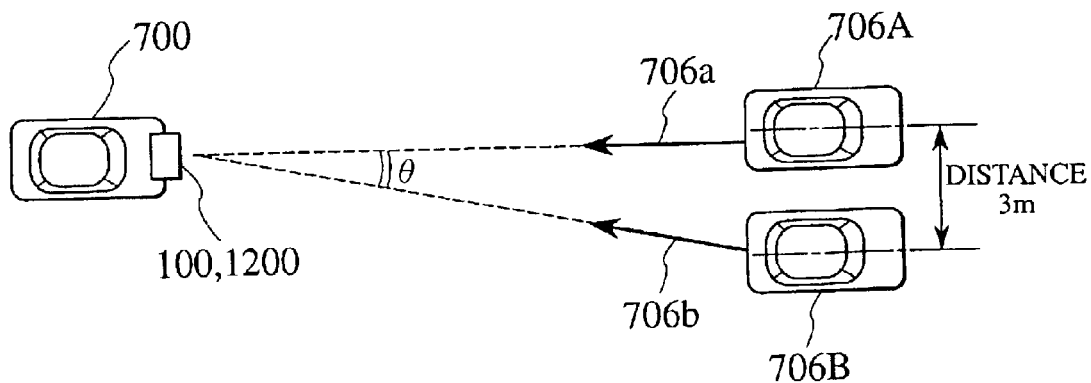
FIG. 21 is a chart illustrating an example of positional relations between a vehicle loaded with the radar relating to the embodiment of the invention and other vehicles.

Since the width of one lane in an actual two lane road is about 3.5 m, it is at least necessary for the radar 100 or 1200 loaded in the traveling vehicle 700 to be capable of detecting two vehicles 706, 706B that are making a stop side by side with a space of about 3 m left, as shown in FIG. 21.

On the assumption that the vehicle 700 loaded with the radar is traveling at a speed of 60 km/h (16.7 m/s), which is the speed limit on the general road, if the oscillation frequency is 76 GHz, the Doppler frequency of the echo 706*a* from the stopping vehicle 706A being on the front of the vehicle 700 is about 8444 Hz from the expression (4). Since the radar loaded in the vehicle traveling at a speed of more than 60 km/h can preferably detect a vehicle at least 50 m ahead, if the distance between the vehicle 700 loaded with the radar and the stopping vehicle 706A on the front thereof is set to be 50 m, an angle θ formed by the traveling direction of the vehicle 700 loaded with the radar and the propagating direction of the echo 706*b* from the stopping vehicle 706B adjacent to the stopping vehicle 706A on the front of the vehicle 700 loaded with the radar is about 3.43°. Therefore, the Doppler frequency of the echo 706*b* from the stopping vehicle 706B adjacent to the stopping vehicle 706A on the front of the vehicle 700 loaded with the radar is about 8429 Hz from the expression (4), if the oscillation frequency is 76 GHz.

According to the sampling theorem, in order to enable sampling at a frequency of 8500 Hz or less, it is necessary to set the sampling interval T to about 1/17000 [sec]. Therefore, in order to enable the sampling of the Doppler frequencies of the echoes from the two stopping vehicles 706A, 706B, the sampling interval T in the A/D converter 34 of the reception unit 30 is needed to be set larger than about 1/17000 [sec]. The upper limit of the sampling interval in the A/D converter 34 of the reception unit 30 is determined by the performance of the A/D converter 34.

In addition, in order to enable the detection of the Doppler frequencies of the respective echoes 706*a*, 706*b* from the two stopping vehicles 706A, 706B, it is necessary to analyze the beat signal into frequency components with a frequency resolution smaller than the difference of these two Doppler frequencies. Where the number N of the sampled signals contained in the time window of the FFT is 256 points, if the sampled signals sampled by the sampling interval of 1/1700 [sec] is down sampled five times the sampling interval thereof, 5/17000 [sec], it will be possible to analyze the beat signal into frequency components with a frequency resolution of about 13 Hz. Therefore, if the sampling interval of the down sampler is set to 5/17000 [sec], it will be possible to detect each of the Doppler frequencies of the respective echoes 706*a*, 706*b* from the two stopping vehicles 706A, 706B, namely, the Doppler frequencies having the frequency difference of about 15 Hz.

In this manner, by setting the specification of the radar in consideration of the actual road environments, a radar more suitable for a practical use can be manufactured. Further, when the width of one lane and the speed limit of the general road are different from what are used here, the actual values should be used to set up the design conditions of the radar.

Figure 17:
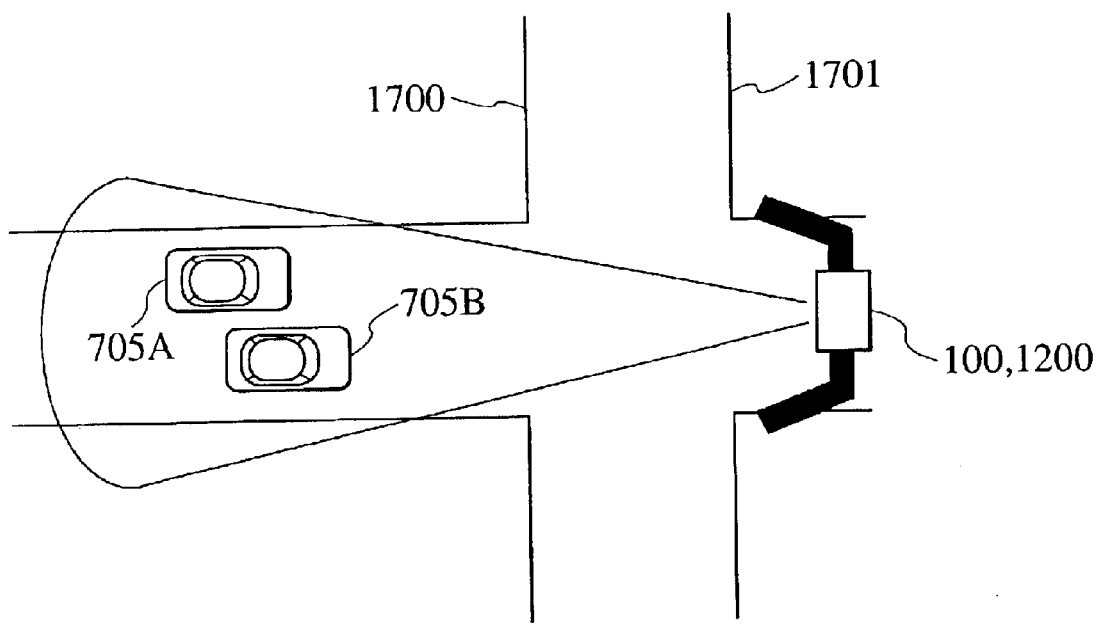
FIG. 17 is a diagram explaining an example of applications of the radar relating to the invention.

As mentioned above, the description has been made on the presumption that the radar is loaded in an automobile. However, the radars relating to the embodiment can be loaded not only in an automobile but also in the other movable bodies. They can also be installed in a building. As shown in FIG. 17, for example, if it is designed to install the radar relating to the embodiment on a stanchion 1701 made to bridge a road 1700, and transmit the radio waves along the road 1700 from the transmission antenna of the radar, it will be possible to precisely detect individual vehicles traveling on the road 1700.

INDUSTRIAL APPLICABILITY

As mentioned above, according to the invention, the radar having a construction different from the conventional radar can enhance the accuracy of detecting an object existing in an area of high importance for the purpose of surveillance.

What is claimed is:

1. A radar that transmits a signal and receives a reflection signal of the signal, comprising:
    a reception means for detecting a beat signal of the reception signal and the transmission signal;
    a first frequency analysis means for analyzing the beat signal into frequency components with a first frequency resolution, and detecting a peak signal of frequency spectra obtained thereby; and
    a second frequency analysis means for analyzing the beat signal into frequency components with a second frequency resolution finer than the first frequency resolution, said second frequency analysis means analyzing the peak signal detected with a threshold value based on the peak signal detected by the first frequency analysis means, and detecting a peak signal of frequency spectra obtained thereby.

2. A radar according to claim 1, comprising a transmission means for emitting a continuous wave subjected to a repetitive frequency modulation, as the radio wave.

3. A radar according to claim 1, wherein the second frequency analysis means analyzes the beat signal into frequency components with second frequency resolution, when the peak signal detected by the first frequency analysis means belongs to a frequency band determined according to a speed of a movable body loaded with the radar.

4. A radar according to claim 3, comprising a transmission means for emitting a plurality of continuous waves of different transmission frequencies as the radio wave.

5. A radar according to claim 1, wherein the second frequency analysis means analyzes the beat signal into frequency components with the second frequency resolution, when the peak signal detected by the first frequency analysis means belongs to a variable frequency band set in advance.

6. A radar according to claim 5, comprising a transmission means for emitting a plurality of continuous waves of different transmission frequencies as the radio wave.

7. A radar according to claim 1, comprising a transmission means for emitting a plurality of continuous waves of different transmission frequencies as the radio wave.

8. A radar according to claim 1, comprising a measurement means for, when the second frequency analysis means detects the peak signal, calculating at least one of a distance from the radar to the object and a relative velocity of the radar and the object, on the basis of the beat signal.

9. A radar according to claim 8, wherein when the first frequency analysis means detects the peak signal, and when the frequency analysis by the second frequency analysis means is not executed, the measurement means calculates at least one of a distance from the radar to the object and a relative velocity of the radar and the object, on the basis of the peak signal detected by the first frequency analysis means.

10. An alarm device, comprising:
a determination means for determining whether or not a calculation result of the measurement means of the radar according to claim 9 satisfies a predetermined information condition; and
a means that informs a determination result of the determination means to a driver.

11. An alarm device, comprising:
a determination means for determining whether or not a calculation result of the measurement means of the radar according to claim 8, satisfies a predetermined information condition; and a means that informs a determination result of the determination means to a driver.

12. A radar according to claim 1, wherein:
the reception means samples the beat signal, and gives sampled signals generated thereby to the first frequency analysis means and the second frequency analysis means;
the first frequency analysis means analyzes the a plurality of sampled signals from the sampling means into frequency components by the Fast Fourier Transform; and
the second frequency analysis means down samples the plurality of sampled signals from the sampling means, and analyzes the plurality of sampled signals generated thereby into frequency components by the Fast Fourier Transform.

13. A radar according to claim 12, wherein the radar is loaded into a vehicle, and when the vehicle is traveling at a speed of 60 km/h or more, the reception means samples the beat signal at sampling intervals whereby the first frequency analysis means is capable of detecting a first stopping vehicle being ahead of 50 m or less from the vehicle, and the second frequency analysis means down samples the beat signal at sampling intervals that allows the detection of both the first stopping vehicle and a second stopping vehicle existing on a lane adjacent to a lane on which the first stopping vehicle exists.

14. A radar according to claim 1, comprising a transmission means for emitting a continuous wave subjected to a repetitive frequency modulation, as the radio wave.

15. A radar according to claim 1, comprising a transmission means for emitting a plurality of continuous waves of different transmission frequencies as the radio wave.

16. A radar as defined in claim 1, wherein said second frequency analysis means comprises:
a low pass filter for removing higher frequency component of an input signal,
a down sampler for sampling an output of said low pass filter, and a fast Fourier transform part for fast-Fourier-transforming an output from said down sampler.

17. The radar according to claim 1, wherein the second frequency analyzing means analysis only the peak signal detected by the first frequency analysis means.

18. A program being executed in a radar, the program allowing the radar to execute the processing of:
detecting a beat signal of a transmission signal from the radar and a reflection signal of the transmission signal from the radar;
a first frequency analysis that analyzes the beat signal into frequency components with a first frequency resolution, and detects a peak signal of frequency spectra obtained thereby; and
a second frequency analysis that analyzes the beat signal into frequency components with a frequency resolution different from that of the first frequency analysis, said second frequency analysis analyzing the peak signal detected with a threshold value based on the peak signal detected by the first frequency analysis, and detects a peak signal of frequency spectra obtained thereby.

19. The program according to claim 18, wherein the second frequency analysis analyzes only the peak signal detected by the first frequency analysis.

20. A program being executed in a radar, the program making the radar execute the processing of:
detecting a beat signal of a transmission signal from the radar and a reflection signal of the transmission signal from the radar;
a first frequency analysis that analyzes the beat signal into frequency components by a first frequency resolution, and detects a peak signal of frequency spectra obtained thereby; and
a second frequency analysis that analyzes the beat signal into frequency components by a second frequency resolution finer than the first frequency resolution, said second frequency analysis analyzing the peak signal detected with a threshold value based on the peak signal detected by the first frequency analysis, and detects a peak signal of frequency spectra obtained thereby.

21. The program according to claim 20, wherein the second frequency analysis analyzer only the peak signal detected by the first frequency analysis.

* * * * *